(12) United States Patent
Cho

(10) Patent No.: US 8,603,390 B2
(45) Date of Patent: Dec. 10, 2013

(54) COPPER-PHOSPHORUS-STRONTIUM BRAZING ALLOY

(75) Inventor: Chu Hyon Cho, Gyeonggi-do (KR)

(73) Assignee: Alcoma, Ltd., Gwangju-si, Gyeonggi-do (KR)

( * ) Notice: Subject to any disclaimer, the term of this patent is extended or adjusted under 35 U.S.C. 154(b) by 0 days.

(21) Appl. No.: 13/466,903

(22) Filed: May 8, 2012

(65) Prior Publication Data

US 2012/0288401 A1      Nov. 15, 2012

(30) Foreign Application Priority Data

May 11, 2011   (KR) ........................ 10-2011-0044112

(51) Int. Cl.
*C22C 9/00*   (2006.01)

(52) U.S. Cl.
USPC ........... 420/499; 148/432; 148/433; 148/434; 148/435; 148/436

(58) Field of Classification Search
USPC .................................. 420/499; 148/432–436
See application file for complete search history.

(56) References Cited

FOREIGN PATENT DOCUMENTS

| | | | |
|---|---|---|---|
| CN | 102888524 A | * | 1/2013 |
| JP | 55097443 A | * | 7/1980 |
| KR | 10-0946936 | | 3/2010 |
| WO | WO2006019035 A | * | 2/2006 |

* cited by examiner

*Primary Examiner* — Sikyin Ip
(74) *Attorney, Agent, or Firm* — Fenwick & West LLP

(57) ABSTRACT

A brazing alloy including copper (Cu), phosphorus (P), and strontium (Sr) and any one element of indium (In), boron (B), silver (Ag), tin (Sn), cesium (Cs), germanium (Ge), and nickel (Ni). The brazing alloy includes 5.0 to 7.5 wt % of phosphorus (P) and 0.1 to 5.0 wt % of strontium (Sr) and the remainder is composed of copper (Cu). The brazing alloy includes copper (Cu), phosphorus (P), and strontium (Sr) unlike the existing alloy element. The brazing alloy further includes, as alloy components, one or more elements of indium (In), boron (B), silver (Ag), and tin (Sn). The brazing alloy includes no silver (Ag) or the silver (Ag) content is reduced compared to an existing brazing alloy containing silver (Ag).

4 Claims, No Drawings

COPPER-PHOSPHORUS-STRONTIUM BRAZING ALLOY

CROSS-REFERENCE TO RELATED APPLICATIONS

This application claims priority to and the benefit of Korean Patent Application No. 10-2011-0044112 filed on May 11, 2011, which is incorporated herein by reference in its entirety.

TECHNICAL FIELD

The present invention relates to a brazing alloy, and particularly, to a brazing alloy comprising copper (Cu), phosphorus (P), and strontium (Sr) and further comprising any one element of indium (In), boron (B), silver (Ag), tin (Sn), cesium (Cs), germanium (Ge), and nickel (Ni).

BACKGROUND ART

Brazing refers to a technique for joining two base metals by applying heat at such a level as not to damage a base metal with a separate metal or alloy having a melting point lower than that of the metal (base metal) molten.

In the brazing, joining (soldering) is performed by using a brazing alloy containing silver and the soldering has been used as an important means in various industrial fields such as a cooling and heating apparatus and the like. For example, soldering is widely used for piping equipment of a typical cooling and heating apparatus or refrigeration equipment.

Further, soldering is used for coupling copper pipe parts or brass parts to a copper pipe and is classified as brazing (hard soldering) and soldering (soft soldering) according to a working temperature. Particularly, the brazing, which is a method of bringing metals into contact to be held together without melting base metals at a working temperature of about 400 to 900° C., is a joining method for forming a strong and tight weld junction between two metals. Therefore, the brazing is used variously for coupling same or similar metals and dissimilar metals, coupling a thick portion and a thin portion, or coupling metals having greatly different melting points.

Particularly, when welding a brass material, if a working temperature increases or a working time lengthens, dezincification occurs on the surface of brass, resulting in generating scales. Since the generated scale obstructs the flow of the welding material, there is a problem in that an oxide needs to be removed during welding by using a flux aid (for example, a gas flux, chlorides, fluorides, boron compounds, and the like).

Currently, silver (Ag) is ineluctably used as an alloy component for solving the problem. Particularly, in a pipe welding field, a material containing 0.5 to 30 wt % of silver (Ag) is used as a welding material when welding brass parts. The reason for adding the silver (Ag) is to improve flow-ability, wet-ability, and adhesiveness on the surface of brass while lowering a melting point.

However, the silver (Ag) is a high-priced precious metal and thus a cost thereof is expected to continue to increase in consideration of the future development trend of an electronic industry or the like. Therefore, in the economic aspect, there is a need to use no high-priced silver or minimize the silver (Ag) content and from the viewpoint of weldability, a brazing alloy capable of further improving a self-fluxing function of a brazing alloy and the affinity between metals is required.

SUMMARY OF THE INVENTION

The present invention has been made in an effort to solve the problem by providing a brazing alloy comprising copper (Cu), phosphorus (P), and strontium (Sr) and further comprising one or more elements selected from a group consisting of indium (In), boron (B), silver (Ag), tin (Sn), cesium (Cs), germanium (Ge), and nickel (Ni), which is economical because the brazing alloy comprises no silver (Ag) or a low content of silver (Ag) and shows equal or more excellent weldability compared to a brazing alloy comprised silver in the related art.

In order to achieve the effect, the present invention provides a brazing alloy, comprising 5.0 to 7.5 wt % of phosphorus (P) and 0.01 to 5.0 wt % of strontium (Sr), in which the remainder is composed of copper (Cu).

An exemplary embodiment of the present invention provides the alloy that may comprise one or more elements selected from a group consisting of 0.01 to 3.0 wt % of indium (In), 0.001 to 0.5 wt % of boron (B), 0.5 to 5.0 wt % of silver (Ag), 0.5 to 5.0 wt % of tin (Sn), 0.01 to 0.1 wt % of cesium (Cs), 0.01 to 0.1 wt % of germanium (Ge), and 0.01 to 0.1 wt % of nickel (Ni).

The brazing alloy according to the exemplary embodiment of the present invention comprises copper (Cu), phosphorus (P), and strontium (Sr) unlike the existing alloy element and further comprises, as alloy components, one or more elements selected from a group consisting of indium (In), boron (B), silver (Ag), and tin (Sn). Therefore, the brazing alloy comprises no silver (Ag) or the remarkably reduced content of silver (Ag) compared to an existing brazing alloy containing silver (Ag), thereby reducing manufacturing costs and providing equal or more excellent weldability compared to the above-described effect.

DETAILED DESCRIPTION

Hereinafter, exemplary embodiments of the present invention will be described in detail in order to sufficiently understand the present invention. The exemplary embodiments of the present invention may be modified in various forms and it should not be construed that the scope of the present invention is limited to the exemplary embodiments described below. The exemplary embodiments are provided to explain the present invention more completely understandable to those skilled in the art. Further, a detailed description of a known function or configuration that may make the scope of the present invention unnecessarily ambiguous will be omitted.

Hereinafter, exemplary embodiments of the present invention will be described in detail to describe a brazing alloy of the present invention.

According to an exemplary embodiment of the present invention, a brazing alloy is a Cu—P—Sr ternary alloy having copper (Cu) as a center element. Hereinafter, respective roles of alloy components will be described.

Phosphorus (P) is a material having a very strong activity and serves to remarkably reduce a liquidus of copper (Cu) up to 715 to 800° C. Further, phosphorus (P) performs a self-fluxing function by being easily coupled with an oxide of the surface of copper (Cu).

The phosphorus (P) content in the brazing alloy according to the exemplary embodiment of the present invention is 5.0 to 7.5 wt %. This is because when the phosphorus (P) content is less than 5.0 wt %, the flux function is insignificant and when the phosphorus (P) content is more than 7.5 wt %, brittleness occurs.

Strontium (Sr), which is an alloying element added to improve weldability, is a material used for producing glass for color television picture tubes and used even in the process of producing ferrite magnets and in refining zinc. Further, since strontium (Sr) is an element which rapidly penetrates and diffuses onto the surface of brass, strontium (Sr) serves to diffuse a welding material in a short time during welding.

The strontium (Sr) content in the brazing alloy according to the exemplary embodiment of the present is 0.01 to 5.0 wt %. This is because when the strontium (Sr) content is less than 0.01 wt %, improvement of weldability is insignificant and when the strontium (Sr) content is more than 5.0 wt %, an indium oxide film is formed and thus flow-ability is deteriorated during welding.

According to another exemplary embodiment of the present invention, a brazing alloy may further comprise one or more elements selected from a group consisting of indium (In), boron (B), silver (Ag), tin (Sn), cesium (Cs), germanium (Ge), and nickel (Ni) in addition to the copper (Cu), the phosphorus (P), and the strontium (Sr).

Indium (In) is an alloy component for lowering the melting point of the brazing alloy, improving flow-ability, and increasing inner toughness.

The indium (In) content in the brazing alloy according to the exemplary embodiment of the present invention is 0.01 to 3.0 wt %. This is because when the indium (In) content is less than 0.01 wt %, the effect of improving flow-ability is insignificant and when the indium (In) content is more than 3.0 wt %, an indium oxide film is formed and thus flow-ability is deteriorated during welding.

Boron (B) is an alloy component added to increase penetration and diffusion force onto the surface of brass and prevent the occurrence of a void due to welding stress and a shrinkage cavity during solidification.

The boron (B) content in the brazing alloy according to the exemplary embodiment of the present invention is 0.001 to 0.5 wt %. This is because when the boron (B) content is less than 0.001 wt %, the effect of preventing the occurrence of the void is insignificant and when the boron (B) content is more than 0.5 wt %, the melting point increases and flow-ability is deteriorated.

Silver (Ag), which is the most useful and important element among the brazing alloying elements, lowers the melting point and improves wet-ability, processability, and the like. Silver (Ag) has excellent corrosion resistance, electrical conductivity, heat conductivity, and the like in itself and when silver (Ag) is combined with another element, strength thereof is improved. Further, since a silver (Ag) alloy shows excellent penetration force in a molten state, a joining surface having excellent toughness can be obtained. However, because of the cost, the general silver (Ag) content is about 0.5 to 30 wt %.

The silver (Ag) content in the brazing alloy according to the exemplary embodiment of the present invention is 0.5 to 15.0 wt %. This is because when the silver (Ag) content is less than 0.5 wt %, the effect of improving flow-ability, weldability, and the like is hardly exhibited and when 15.0 wt % of silver (Ag) is added, the same characteristics as those of a welding material containing 30 wt % of silver (Ag) are generally exhibited.

Since tin (Sn) has a very low melting point, tin (Sn) is an element added to lowering the melting point of the brazing alloy. Tin (Sn) improves flow-ability, wet-ability, and penetration force of the molten brazing alloy.

The tin (Sn) content in the brazing alloy according to the exemplary embodiment of the present invention is 0.5 to 5.0 wt %. This is because when the tin (Sn) content is less than 0.5 wt %, the effect of improving flow-ability, weldability, and the like is hardly exhibited and when the tin (Sn) content is more than 5.0 wt %, low-temperature brittleness occurs.

Cesium (Cs), which is an element used even for oil drilling, atomic clocks, multiple optical and electronic devices, and the like, is a component for stabilizing the arc.

The cesium (Cs) content in the brazing alloy according to the exemplary embodiment of the present invention is 0.01 to 0.1 wt %. Reverse polarity and straight polarity are used to stabilize the arc and reduce a spatter level, thereby having a high-quality welding effect.

Germanium (Ge), which is an element widely used in a semiconductor industry and used for an alloy material, a catalyst, a phosphor, an infrared device, and the like, is a component for lowering the melting point of the brazing alloy and improving flow-ability.

The germanium (Ge) content in the brazing alloy according to the exemplary embodiment of the present is 0.01 to 0.1 wt %. The germanium (Ge) stabilizes the arc to have a high-quality welding effect.

Nickel (Ni) is a silver-white high glossy metal. Nickel (Ni), which is an element used as a material of coins through plating or alloying because nickel (Ni) is not changed in air and does not cause an oxidation reaction, has the effect of providing a stable operation when being welded to the brazing alloy.

The nickel (Ni) content in the brazing alloy according to the exemplary embodiment of the present invention is 0.01 to 0.1 wt %. Nickel (Ni) stabilizes arc to have a high-quality welding effect and is not changed in air and does not cause an oxidation reaction, thereby having a stable welding effect.

Lastly, copper (Cu) is an element having useful characteristics similar to those of silver (Ag) in the brazing alloy. Copper (Cu) has many advantages such as ductility, heat conductivity, conductivity, corrosion resistance, and strong penetration force, and the like.

The brazing alloy according to the exemplary embodiment of the present invention comprises copper (Cu) as the remainder except for the alloy components.

Example

Brazing alloys were manufactured with the following composition.

TABLE 1

|  | Cu | P | Sr | In | B | Ag | Sn | Cs | Ge | Ni |
|---|---|---|---|---|---|---|---|---|---|---|
| Example 1 | bal. | 7 | 1.0 | | | | | | | |
| Example 2 | bal. | 6.8 | 0.1 | 0.5 | | | | | | |
| Example 3 | bal. | 6.8 | 0.4 | | 0.05 | | | | | |
| Example 4 | bal. | 6.5 | 0.04 | | | 2 | | | | |
| Example 5 | bal. | 6.8 | 1.0 | | | | 5 | | | |
| Example 6 | bal. | 6.8 | 0.7 | | | | | 0.07 | | |
| Example 7 | bal. | 6.5 | 0.7 | | | | | | 0.07 | |
| Example 8 | bal. | 6.5 | 0.7 | | | | | | | 0.07 |
| Comparative Example 1 | bal. | 6.25 | | | | 5 | | | | |

TABLE 1-continued

|  | Cu | P | Sr | In | B | Ag | Sn | Cs | Ge | Ni |
|---|---|---|---|---|---|---|---|---|---|---|
| Comparative Example 2 | bal. | 5.05 |  |  |  | 15 |  |  |  |  |

(Unit: wt %)
Comparative Example 1 KS-BCUP-3
Comparative Example 2 KS-BCUP-5

A solidus, a liquidus, and tensile strength of each of the brazing alloys manufactured as above were measured and the results are shown in Table 2.

TABLE 2

|  | Solidus (° C.) | Liquidus (° C.) | Tensile strength (N/mm$^2$) |
|---|---|---|---|
| Example 1 | 709 | 755 | 997 |
| Example 2 | 688 | 755 | 1105 |
| Example 3 | 705 | 775 | 1105 |
| Example 4 | 646 | 770 | 1145 |
| Example 5 | 673 | 680 | 960 |
| Example 6 | 677 | 690 | 1111 |
| Example 7 | 681 | 685 | 1001 |
| Example 8 | 701 | 710 | 995 |
| Comparative Example 1 | 645 | 815 |  |
| Comparative Example 2 | 645 | 800 |  |

Evaluation of Weldability

Welding a Copper Pipe to a Three-Directional Brass Distribution Pipe 32 samples of a U-shaped three-directional brass distribution pipe for a cooler were welded under the following welding condition, followed by cutting and then cross sections thereof were tested. In this case, as a welding material, Example 1 and Comparative Example 1 (KS-BCUP-3. containing 5 wt % of Ag) were used.

Caliber: 40 mm, 24 mm
Heating condition: supplying an LNG, a gas torch, and a gas flux (methyl borate)
Welding temperature: 830 to 860° C.
Supplying a welding bar: bobbin in which a wire diameter is 1.8 mm, automatically supplying a predetermined amount
Welding machine: automatic welding machine manufactured by SK BRAZING CO.

As shown in Table 2, the brazing alloy of Example 1 had a higher solidus temperature compared to Comparative Example 1. Therefore, a melting time of the welding material in Example 1 was longer compared to Comparative Example 1. However, since the penetration speed into the brass distribution pipe in Example 1 was faster compared to Comparative Example 1, a welding completion time of Example 1 was quicker than that of Comparative Example 1 by one second.

Therefore, it could be verified that the brazing alloy according to the exemplary embodiment of the present invention does not contain silver (Ag), but exhibits more excellent weldability than an alloy containing silver (Ag) in the related art.

Therefore, it can be seen that the case of using the welding material of Example 1 exhibits excellent penetration at a welding portion. Therefore, it could be verified that the brazing alloy according to the exemplary embodiment of the present invention does not contain silver (Ag), but exhibits more excellent weldability such as wet-ability and penetration than an alloy containing silver (Ag) in the related art.

Like Example 1, it could be verified that the brazing alloys of Examples 2 to 8 exhibited excellent or similar weldability compared to an alloy containing silver (Ag) in the related art. Also, even though the brazing alloys do not contain silver (Ag), the brazing alloys exhibited similar or more excellent weldability such as wet-ability and penetration than the alloy containing silver (Ag) in the related art.

The exemplary embodiment of the brazing alloy of the present invention explained above is illustrative only and a skilled person in the art to which the present invention pertains could understand well that various modifications and other equivalent exemplary embodiments may be made. Therefore, it will be understood that the present invention is not limited only to exemplary embodiments described in the specification of the invention. Therefore, the true technical scope of the present invention should be defined according to the technical spirit of the appended claims. Also, it should be construed that the present invention covers all the modifications, equivalents, and substitutions included within the scope of the present invention defined by the appended claims.

The invention claimed is:

1. A brazing alloy, comprising:
   5.0 to 7.5 wt % of phosphorus (P); and
   0.01 to 5.0 wt % of strontium (Sr),
   wherein the remainder is composed of copper (Cu).

2. The brazing alloy of claim 1, further comprising 0.001 to 0.5 wt % of boron (B).

3. The brazing alloy of claim 2, further comprising one or more elements selected from the group consisting of 0.01 to 3.0 wt % of indium (In), 0.5 to 5.0 wt % of silver (Ag), 0.5 to 5.0 wt % of tin (Sn), 0.01 to 0.1 wt % of cesium (Cs), 0.01 to 0.1 wt % of germanium (Ge), and 0.01 to 0.1 wt % of nickel (Ni).

4. The brazing alloy of claim 1, further comprising one or more elements selected from the group consisting of 0.01 to 3.0 wt % of indium (In), 0.5 to 5.0 wt % of silver (Ag), 0.5 to 5.0 wt % of tin (Sn), 0.01 to 0.1 wt % of cesium (Cs), 0.01 to 0.1 wt % of germanium (Ge), and 0.01 to 0.1 wt % of nickel (Ni).

* * * * *